United States Patent
Kasaragod

(10) Patent No.: US 11,119,813 B1
(45) Date of Patent: Sep. 14, 2021

(54) MAPREDUCE IMPLEMENTATION USING AN ON-DEMAND NETWORK CODE EXECUTION SYSTEM

(71) Applicant: Amazon Technologies, Inc., Seattle, WA (US)

(72) Inventor: Sunil Mallya Kasaragod, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 802 days.

(21) Appl. No.: 15/359,391

(22) Filed: Nov. 22, 2016

Related U.S. Application Data

(60) Provisional application No. 62/402,946, filed on Sep. 30, 2016.

(51) Int. Cl.
*G06F 9/48* (2006.01)

(52) U.S. Cl.
CPC ................ *G06F 9/4806* (2013.01)

(58) Field of Classification Search
CPC .... G06F 9/4806; G06F 9/4812; G06F 9/4843; G06F 9/485
USPC ........................ 717/101–106; 718/101–106
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,325,526 A * | 6/1994 | Cameron | G06F 9/5066 711/173 |
| 5,970,488 A | 10/1999 | Crowe et al. | |
| 6,385,636 B1 | 5/2002 | Suzuki | |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Huang et al, "Speed-based Load Balancer for Scheduling Reduce Tasks to Process Intermediate Data of MapReduce Applications on Cloud Computing", ACM, pp. 1-6 (Year: 2015).*

(Continued)

*Primary Examiner* — Anil Khatri
(74) *Attorney, Agent, or Firm* — Knobbe, Martens, Olson & Bear, LLP

(57) ABSTRACT

Systems and methods are described for providing an implementation of the MapReduce programming model utilizing tasks executing on an on-demand code execution system or other distributed code execution environment. A coordinator task may be used to obtain a request to process a set of data according to the implementation of the MapReduce programming model, to initiate executions of a map task to analyze that set of data, and to initiate executions of a reduce task to reduce outputs of the map task executions to a single results file. The coordinator task may be event-driven, such that it executes in response to completion of executions of the map task or reduce tasks, and can be halted or paused during those executions. Thus, the MapReduce programming model may be implemented without the use of a dedicated framework or infrastructure to manage map and reduce functions.

17 Claims, 7 Drawing Sheets

(56) References Cited

U.S. PATENT DOCUMENTS

| | | | | |
|---|---|---|---|---|
| 6,463,509 | B1 | 10/2002 | Teoman et al. | |
| 6,523,035 | B1 | 2/2003 | Fleming et al. | |
| 6,708,276 | B1 | 3/2004 | Yarsa et al. | |
| 7,036,121 | B1 | 4/2006 | Casabona et al. | |
| 7,360,215 | B2 * | 4/2008 | Kraiss | G06Q 99/00 703/22 |
| 7,590,806 | B2 | 9/2009 | Harris et al. | |
| 7,665,090 | B1 | 2/2010 | Tormasov et al. | |
| 7,707,579 | B2 | 4/2010 | Rodriguez | |
| 7,730,464 | B2 | 6/2010 | Trowbridge | |
| 7,774,191 | B2 | 8/2010 | Berkowitz et al. | |
| 7,823,186 | B2 | 10/2010 | Pouliot | |
| 7,836,448 | B1 * | 11/2010 | Farizon | G06F 9/4843 709/225 |
| 7,886,021 | B2 | 2/2011 | Scheifler et al. | |
| 8,010,990 | B2 | 8/2011 | Ferguson et al. | |
| 8,024,564 | B2 | 9/2011 | Bassani et al. | |
| 8,046,765 | B2 | 10/2011 | Cherkasova et al. | |
| 8,051,180 | B2 | 11/2011 | Mazzaferri et al. | |
| 8,051,266 | B2 | 11/2011 | DeVal et al. | |
| 8,065,676 | B1 | 11/2011 | Sahai et al. | |
| 8,065,682 | B2 | 11/2011 | Baryshnikov et al. | |
| 8,095,931 | B1 | 1/2012 | Chen et al. | |
| 8,127,284 | B2 | 2/2012 | Meijer et al. | |
| 8,146,073 | B2 | 3/2012 | Sinha | |
| 8,166,304 | B2 | 4/2012 | Murase et al. | |
| 8,171,473 | B2 | 5/2012 | Lavin | |
| 8,209,695 | B1 | 6/2012 | Pruyne et al. | |
| 8,219,987 | B1 | 7/2012 | Vlaovic et al. | |
| 8,260,840 | B1 * | 9/2012 | Sirota | G06F 9/5061 370/216 |
| 8,321,554 | B2 | 11/2012 | Dickinson | |
| 8,321,558 | B1 | 11/2012 | Sirota et al. | |
| 8,336,079 | B2 | 12/2012 | Budko et al. | |
| 8,352,608 | B1 | 1/2013 | Keagy et al. | |
| 8,429,282 | B1 | 4/2013 | Ahuja | |
| 8,448,165 | B1 | 5/2013 | Conover | |
| 8,490,088 | B2 | 7/2013 | Tang | |
| 8,555,281 | B1 | 10/2013 | Van Dijk et al. | |
| 8,566,835 | B2 | 10/2013 | Wang et al. | |
| 8,613,070 | B1 | 12/2013 | Borzycki et al. | |
| 8,631,130 | B2 | 1/2014 | Jackson | |
| 8,645,966 | B2 * | 2/2014 | Andrade | G06F 11/3447 718/104 |
| 8,677,359 | B1 | 3/2014 | Cavage et al. | |
| 8,694,996 | B2 | 4/2014 | Cawlfield et al. | |
| 8,719,415 | B1 | 5/2014 | Sirota et al. | |
| 8,725,702 | B1 | 5/2014 | Raman et al. | |
| 8,732,720 | B2 * | 5/2014 | Verma | G06F 9/5066 707/705 |
| 8,756,696 | B1 | 6/2014 | Miller | |
| 8,769,519 | B2 | 7/2014 | Leitman et al. | |
| 8,799,236 | B1 | 8/2014 | Azad et al. | |
| 8,799,879 | B2 | 8/2014 | Wright et al. | |
| 8,806,468 | B2 | 8/2014 | Meijer et al. | |
| 8,819,679 | B2 | 8/2014 | Agarwal et al. | |
| 8,825,863 | B2 | 9/2014 | Hansson et al. | |
| 8,825,964 | B1 | 9/2014 | Sopka et al. | |
| 8,850,432 | B2 | 9/2014 | McGrath et al. | |
| 8,850,437 | B2 * | 9/2014 | Shutkin | G06F 9/5066 718/102 |
| 8,874,952 | B2 | 10/2014 | Tameshige et al. | |
| 8,904,008 | B2 | 12/2014 | Calder et al. | |
| 8,924,978 | B2 * | 12/2014 | Meng | G06F 9/5061 718/102 |
| 8,997,093 | B2 | 3/2015 | Dimitrov | |
| 9,002,871 | B2 * | 4/2015 | Bulkowski | G06F 16/2272 707/763 |
| 9,021,501 | B2 * | 4/2015 | Li | G06F 9/5066 718/106 |
| 9,027,087 | B2 | 5/2015 | Ishaya et al. | |
| 9,038,068 | B2 | 5/2015 | Engle et al. | |
| 9,052,935 | B1 | 6/2015 | Rajaa | |
| 9,086,897 | B2 | 7/2015 | Oh et al. | |
| 9,092,837 | B2 | 7/2015 | Bala et al. | |
| 9,098,528 | B2 | 8/2015 | Wang | |
| 9,104,477 | B2 * | 8/2015 | Kodialam | G06F 9/4881 |
| 9,110,732 | B1 | 8/2015 | Forschmiedt et al. | |
| 9,110,770 | B1 | 8/2015 | Raju et al. | |
| 9,111,037 | B1 | 8/2015 | Nalis et al. | |
| 9,112,813 | B2 | 8/2015 | Jackson | |
| 9,141,410 | B2 | 9/2015 | Leafe et al. | |
| 9,146,764 | B1 | 9/2015 | Wagner | |
| 9,152,406 | B2 | 10/2015 | De et al. | |
| 9,164,754 | B1 | 10/2015 | Pohlack | |
| 9,183,019 | B2 | 11/2015 | Kruglick | |
| 9,208,007 | B2 | 12/2015 | Harper et al. | |
| 9,218,190 | B2 | 12/2015 | Anand et al. | |
| 9,223,561 | B2 | 12/2015 | Orveillon et al. | |
| 9,223,966 | B1 | 12/2015 | Satish et al. | |
| 9,250,893 | B2 | 2/2016 | Blahaerath et al. | |
| 9,268,586 | B2 | 2/2016 | Voccio et al. | |
| 9,298,633 | B1 | 3/2016 | Zhao et al. | |
| 9,317,689 | B2 | 4/2016 | Aissi | |
| 9,323,556 | B2 | 4/2016 | Wagner | |
| 9,361,145 | B1 | 6/2016 | Wilson et al. | |
| 9,405,582 | B2 * | 8/2016 | Fuller | G06F 9/5066 |
| 9,411,645 | B1 * | 8/2016 | Duan | G06F 9/4887 |
| 9,413,626 | B2 | 8/2016 | Reque et al. | |
| 9,430,290 | B1 * | 8/2016 | Gupta | G06F 9/52 |
| 9,436,555 | B2 | 9/2016 | Dornemann et al. | |
| 9,461,996 | B2 | 10/2016 | Hayton et al. | |
| 9,471,390 | B2 * | 10/2016 | He | G06F 9/4881 |
| 9,471,775 | B1 | 10/2016 | Wagner et al. | |
| 9,483,335 | B1 | 11/2016 | Wagner et al. | |
| 9,489,227 | B2 | 11/2016 | Oh et al. | |
| 9,497,136 | B1 | 11/2016 | Ramarao et al. | |
| 9,537,788 | B2 | 1/2017 | Reque et al. | |
| 9,575,798 | B2 | 2/2017 | Terayama et al. | |
| 9,588,790 | B1 | 3/2017 | Wagner et al. | |
| 9,596,350 | B1 | 3/2017 | Dymshyts et al. | |
| 9,600,312 | B2 | 3/2017 | Wagner et al. | |
| 9,652,306 | B1 | 5/2017 | Wagner et al. | |
| 9,652,617 | B1 | 5/2017 | Evans et al. | |
| 9,654,508 | B2 | 5/2017 | Barton et al. | |
| 9,661,011 | B1 | 5/2017 | Van Horenbeeck et al. | |
| 9,678,773 | B1 | 6/2017 | Wagner et al. | |
| 9,678,778 | B1 | 6/2017 | Youseff | |
| 9,703,681 | B2 | 7/2017 | Taylor et al. | |
| 9,715,402 | B2 | 7/2017 | Wagner et al. | |
| 9,727,725 | B2 | 8/2017 | Wagner et al. | |
| 9,733,967 | B2 | 8/2017 | Wagner et al. | |
| 9,760,387 | B2 | 9/2017 | Wagner et al. | |
| 9,767,271 | B2 | 9/2017 | Ghose | |
| 9,785,476 | B2 | 10/2017 | Wagner et al. | |
| 9,787,779 | B2 | 10/2017 | Frank et al. | |
| 9,798,831 | B2 * | 10/2017 | Chattopadhyay | G06F 16/245 |
| 9,811,363 | B1 | 11/2017 | Wagner | |
| 9,811,434 | B1 | 11/2017 | Wagner | |
| 9,830,175 | B1 | 11/2017 | Wagner | |
| 9,830,193 | B1 | 11/2017 | Wagner et al. | |
| 9,830,449 | B1 | 11/2017 | Wagner | |
| 9,836,324 | B2 * | 12/2017 | Chin | G06F 9/4881 |
| 9,864,636 | B1 | 1/2018 | Patel et al. | |
| 9,910,713 | B2 | 3/2018 | Wisniewski et al. | |
| 9,921,864 | B2 | 3/2018 | Singaravelu et al. | |
| 9,928,108 | B1 | 3/2018 | Wagner et al. | |
| 9,929,916 | B1 | 3/2018 | Subramanian et al. | |
| 9,930,103 | B2 | 3/2018 | Thompson | |
| 9,930,133 | B2 | 3/2018 | Susarla et al. | |
| 9,952,896 | B2 | 4/2018 | Wagner et al. | |
| 9,977,691 | B2 | 5/2018 | Marriner et al. | |
| 9,979,817 | B2 | 5/2018 | Huang et al. | |
| 10,002,026 | B1 | 6/2018 | Wagner | |
| 10,013,267 | B1 | 7/2018 | Wagner et al. | |
| 10,042,660 | B2 | 8/2018 | Wagner et al. | |
| 10,048,974 | B1 | 8/2018 | Wagner et al. | |
| 10,061,613 | B1 | 8/2018 | Brooker et al. | |
| 10,067,801 | B1 | 9/2018 | Wagner | |
| 10,102,040 | B2 | 10/2018 | Marriner et al. | |
| 10,108,443 | B2 | 10/2018 | Wagner et al. | |
| 10,140,137 | B2 | 11/2018 | Wagner | |
| 10,162,672 | B2 | 12/2018 | Wagner et al. | |

(56) References Cited

U.S. PATENT DOCUMENTS

| | | |
|---|---|---|
| 10,162,688 B2 | 12/2018 | Wagner |
| 10,198,298 B2 * | 2/2019 | Bishop .................. G06F 9/5088 |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,615,984 B1 * | 4/2020 | Wang ..................... H04L 63/06 |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | McCarthy |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0199000 A1 | 8/2007 | Shekhel et al. |
| 2007/0220009 A1 | 9/2007 | Morris et al. |
| 2007/0255604 A1 | 11/2007 | Seelig |
| 2008/0028409 A1 | 1/2008 | Cherkasova et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0201711 A1 | 8/2008 | Amir Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0291041 A1 * | 11/2012 | Cipar ................... G06F 9/5011 718/104 |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |

(56) References Cited

U.S. PATENT DOCUMENTS

| | | |
|---|---|---|
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0318269 A1* | 11/2013 | Dalal .................. G06F 13/1652 710/113 |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344736 A1 | 11/2014 | Ryman et al. |
| 2014/0380085 A1 | 12/2014 | Rash et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote |
| 2015/0052258 A1 | 2/2015 | Johnson et al. |
| 2015/0058914 A1 | 2/2015 | Yadav |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0350099 A1 | 12/2016 | Suparna et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378554 A1 | 12/2016 | Gummaraju et al. |
| 2017/0060621 A1 | 3/2017 | Whipple et al. |
| 2017/0083381 A1 | 3/2017 | Cong et al. |
| 2017/0085447 A1 | 3/2017 | Chen et al. |
| 2017/0093920 A1 | 3/2017 | Ducatel et al. |
| 2017/0177391 A1 | 6/2017 | Wagner et al. |
| 2017/0206116 A1 | 7/2017 | Reque et al. |
| 2017/0286143 A1 | 10/2017 | Wagner et al. |
| 2017/0371724 A1 | 12/2017 | Wagner et al. |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0275987 A1 | 9/2018 | Vandeputte |
| 2018/0309819 A1 | 10/2018 | Thompson |
| 2019/0050271 A1 | 2/2019 | Marriner et al. |
| 2019/0073234 A1 | 3/2019 | Wagner et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |

FOREIGN PATENT DOCUMENTS

| | | |
|---|---|---|
| JP | 2006-107599 A | 4/2006 |
| JP | 2010-026562 A | 2/2010 |
| JP | 2011257847 A | 12/2011 |
| WO | WO 2008/114454 A1 | 9/2008 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |

(56) References Cited

FOREIGN PATENT DOCUMENTS

| WO | WO 2017/059248 A1 | 4/2017 |
|---|---|---|
| WO | WO 2017/112526 A1 | 6/2017 |
| WO | WO 2017/172440 A1 | 10/2017 |

OTHER PUBLICATIONS

Condie et al, "Online Aggregation and Continuous Query support in MapReduce", ACM, pp. 1115-1118 (Year: 2010).*
Polo et al, "Performance-Driven Task Co-Scheduling for MapReduce Environments", IEEE, pp. 373-380 (Year: 2010).*
Ekanayake et al, "Twister: A Runtime for Iterative MapReduce", ACM, pp. 810-818 (Year: 2010).*
Dean et al, "MapReduce: Simplified Data Processing on Large Clusters", ACM, pp. 107-113 (Year: 2008).*
Kim et al, "MRBench : A Benchmark for Map-Reduce Framework", IEEE, pp. 11-18 (Year: 2008).*
Lin, "MR-Apriori: Association Rules Algorithm Based on MapReduce", IEEE, pp. 141-144 (Year: 2014).*
Yang, The Application of MapReduce in the Cloud Computing:, IEEE, pp. 154-156 (Year: 2011).*
Hammoud et al, "Locality-Aware Reduce Task Scheduling for MapReduce", IEEE, pp. 570-576 (Year: 2011).*
Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 8, 2017].
Adapter Pattern, Wikipedia, https://en.wikipedia.org/w/index.php?title-Adapter_pattern&oldid=654971255, [retrieved May 26, 2016], 6 pages.
Amazon, "AWS Lambda: Developer Guide", Retrieved from the Internet, Jun. 26, 2016, URL: http://docs.aws.amazon.com/lambda/latest/dg/lambda-dg.pdf, 346 pages.
Amazon, "AWS Lambda: Developer Guide", Retrieved from the Internet, 2019, URL: http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H. and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L. et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 20160
International Preliminary Report on Patentability in PCT/US2015/052833 dated Apr. 4, 2017.
Extended Search Report in European Application No. 15846542.7 dated Aug. 27, 2018.

(56) References Cited

OTHER PUBLICATIONS

International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.

* cited by examiner

MAPREDUCE IMPLEMENTATION USING AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

One example use of data centers is to process or analyze large data sets, which may be impractical to analyze using a single computing device. Various techniques have been developed to allow for multiple computing devices (or in some instances multiple processors within a single computing device) to process data concurrently. This concurrent data processing is sometimes referred to as "parallelization." One technique for allowing parallelization in processing data sets is the "MapReduce" programming model. This programming model generally requires a centralized "infrastructure" or "framework," which controls execution of two functions by individual computing devices within a set of devices. Execution of the first function, a "map" function, causes multiple devices to process portions (or "chunks") of a full set of raw data to generate a set of intermediate results, such as counts of individual words within a corpus of text. Execution of the second function, a "reduce" function, causes one or more devices to combine multiple sets of intermediate results (from multiple map functions) to produce a set of aggregated results. The reduce functions may be executed multiple times, with each execution further reducing the number of aggregated results, until a single aggregate result record is created. In traditional implementations of the MapReduce programming model, an infrastructure or framework must typically execute continuously to coordinate execution of map and reduce functions until a result is provided.

DETAILED DESCRIPTION

Figure 1:
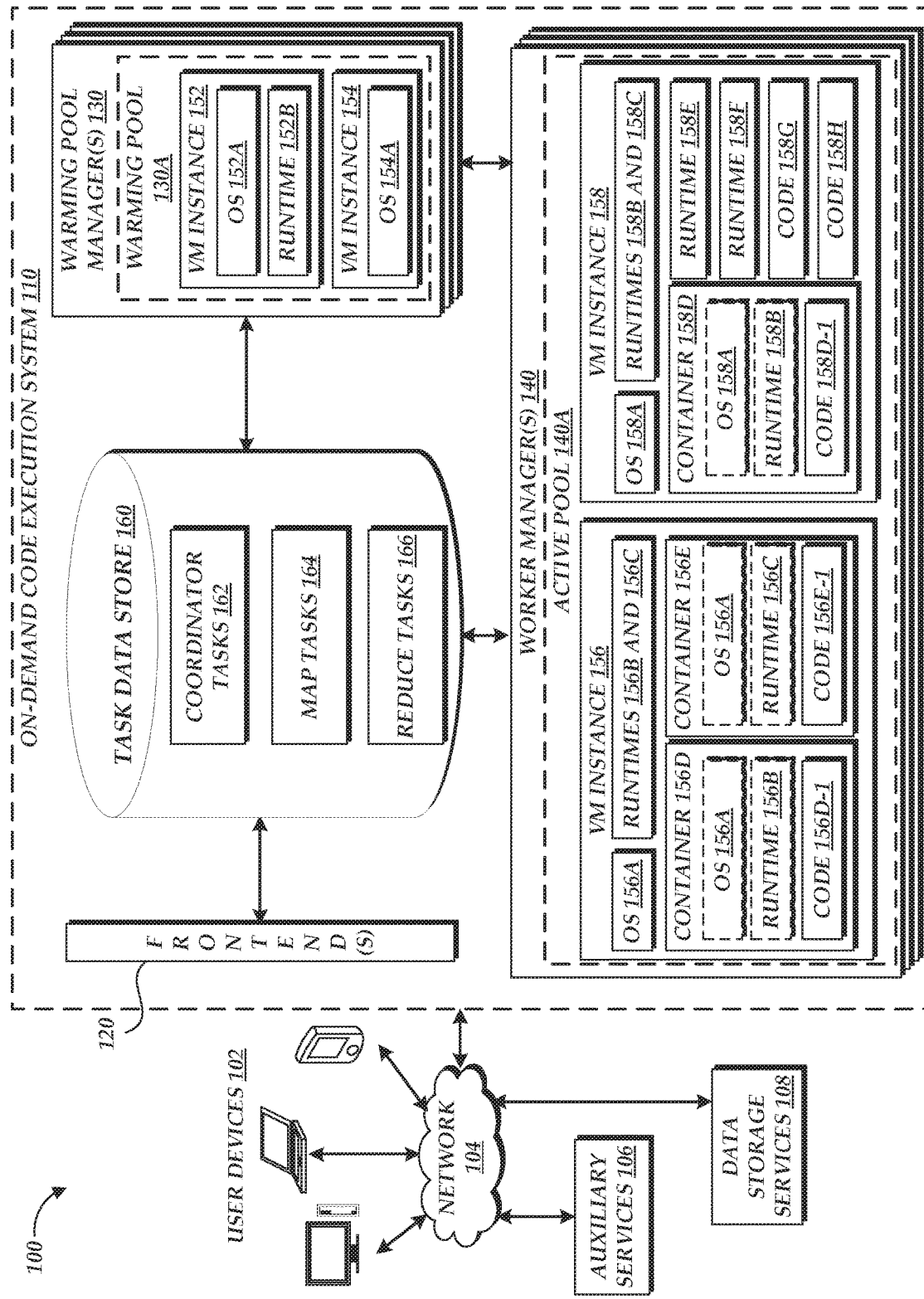
FIG. 1 is a block diagram depicting an illustrative environment in which an on-demand code execution environment can operate to process data sets according to the MapReduce programming model, utilizing a coordinator implemented as one or more tasks within the on-demand code execution environment.

Generally described, aspects of the present disclosure relate to an on-demand code execution environment that enables clients to request execution of user-defined code in order to process data according to the MapReduce programming model. More specifically, aspects of the present disclosure enable an implementation of the MapReduce programming model on the on-demand code execution environment without the need for a dedicated framework or infrastructure to manage execution of map and reduce functions within the implementation. Instead, embodiments of the present disclosure may utilize coordinator functions, or "tasks," in the on-demand code execution environment to organize execution of map and reduce functions, allowing for increases in the flexibility, speed, and efficiency of the implementation when compared to traditional MapReduce implementations.

As described in detail herein, an on-demand code execution environment may provide a network-accessible service enabling users to submit or designate computer-executable code to be executed by virtual machine instances on the on-demand code execution environment. Each set of code on the on-demand code execution environment may define a "task," and implement specific functionality corresponding to that task when executed on a virtual machine instance of the on-demand code execution environment. Individual implementations of the task on the on-demand code execution environment may be referred to as an "execution" of the task (or a "task execution"). The on-demand code execution environment can further enable users to trigger execution of a task based on a variety of potential events, such as detecting new data at a network-based storage system, transmission of an application programming interface ("API") call to the on-demand code execution environment, or transmission of a specially formatted hypertext transport protocol ("HTTP") packet to the on-demand code execution environment. Thus, users may utilize the on-demand code execution environment to execute any specified executable code "on-demand," without requiring configuration or maintenance of the underlying hardware or infrastructure on which the code is executed. Further, the on-demand code execution environment may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution environment can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

In accordance with embodiments of the present disclosure, an on-demand code execution environment may be utilized to process data sets, and particularly large data sets (e.g., on the order of gigabytes, terabytes, petabytes, etc.), according to an implementation of the MapReduce programming model, whereby a map function, a reduce function, and coordination of such functions are implemented as tasks within the on-demand code execution system. As will be described in more detail below, implementation of the MapReduce programming model on an on-demand code execution environment can provide many benefits over traditional MapReduce implementations, such as reducing the need to manage configuration and deployment of worker computing nodes (the management of which may be provided by the on-demand code execution environment), as well as reducing the need for a dedicated "infrastructure" or "framework" to coordinate working computing nodes. Illustratively, rather than utilizing a dedicated infrastructure or framework, an implementation of the MapReduce programming model as described herein may utilize an event-driven "coordinator" task, which functions to determine a current state of the implementation and generate a set of calls to tasks (such as map or reduce tasks) to move that state forward toward completion. After transmitting the set of calls, the coordinator function can cease or pause operation until results of one or more of the called tasks are received. Thereafter, the coordinator function can be re-invoked (e.g., by execution of a new task or resumption of a past task) to re-determine a current state of the implementation and generate a set of calls to tasks, if any, to move that state forward toward completion. In the instance that the coordinator function determines that processing is complete, the function may return a result to a client. Thus, the MapReduce programming model may be implemented as a set of tasks on an on-demand code execution system.

As will be appreciated by one of skill in the art in light of the present disclosure, the embodiments disclosed herein improves the ability of computing systems, such as on-demand code execution environments, to process and analyze data sets in a parellizable manner. Moreover, the embodiments disclosed herein represent an improvement to the MapReduce programming model, by reducing or eliminating the need for a persistent framework or infrastructure and by reducing the need for an implementation of the MapReduce programming model to generate or manage worker computing devices that execute map or reduce functions within the implementation. Moreover, the presently disclosed embodiments address technical problems inherent within computing systems; specifically, the limited nature of computing resources in processing large data sets and the inherent complexities in providing rapid, parallelized executions. These technical problems are addressed by the various technical solutions described herein, including the implementation of an event-driven coordinator task on an on-demand code execution environment that coordinates implementation of map and reduce functions to produce an output. Thus, the present disclosure represents an improvement on existing data processing systems and computing systems in general.

The general execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to retrieve a set of data to be analyzed, and store information (e.g., results) regarding that analysis. The network-based data storage services 108 may represent, for example, a relational or non-relational database. In another example, the network-based data storage services 108 may represent a network-attached storage (NAS), configured to provide access to data arranged as a file system. In some instances, different types of network-based data storage services 108 may provide different benefits to an implementation of the MapReduce programming model. For example, some types of network-based data storage services 108 may provide for use of "atomic counters," whereby a data item's value can, within a distributed system, be reliably increased or decreased by a set amount (e.g., one), regardless of its present value. Illustratively, network-based data storage services 108 that provide "atomic counters" with respect to data items may reduce the number of executions of a reduce task that are needed to reduce intermediate results into a final result, as each execution of the reduce task may utilize atomic counters as a store for aggregated results. Various other functionalities may be included within network-based data storage services 108 usable within embodiments of the present disclosure. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may correspond to code executable to implement "map" and "reduce" functions with respect to a data set.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

In accordance with embodiments of the present disclosure, user-submitted code may correspond to a map function and a reduce function for a set of data. In one embodiment, each of the map function and the reduce function may correspond to a distinct set of code, corresponding to a distinct task on the on-demand code execution system 110. In another embodiment, both the map and reduce function may correspond to a single task on the on-demand code execution system 110. In accordance with the MapReduce programming model, the specific functionalities of the map and reduce functions may vary according to the data to be processed. However, in general terms, a map function may correspond to code that processes a portion of an initial data set (e.g., "raw" data) in order to generate intermediate results, while a reduce function corresponds to code to "reduce" or aggregate multiple intermediate results to an aggregate result. For example, a map function may correspond to code to process a corpus of words (e.g., a book or a collection of books) and generate a count of individual words (or, in some instances, specific classes of words, such as surnames) within the corpus. A corresponding reduce function can correspond to code that aggregates the counts of individual words, as produced by individual executions of the map function. Illustratively, a reduce function may take one thousand intermediate count data files, as produced by one thousand instances of the map function, and generate a single data file aggregating the counts of each word within the one thousand intermediate count data files. Where only a single reduce function is executed, the single data file can represent the result of the analysis. Where multiple reduce functions are executed, resulting in multiple outputs (each aggregating counts of words within a set of inputs), an additional reduce function can process those multiple outputs to further aggregate word counts. This process can continue until single reduce function is called, resulting in a single output file as the result of the analysis.

Because map and reduce functions are often specific to the data to be processed, code corresponding to these functions may be provided by an end user requesting analysis of a corresponding data set. In some instances, the on-demand code execution system 110 may also provide one or more sets of corresponding map and reduce functions (e.g., corresponding to commonly desired analysis types and configured to process data within an expected format).

In addition, the on-demand code execution system 110 may provide a coordinator task, including code executable to manage and coordinate implementation of map and reduce tasks (e.g., tasks corresponding to code implementing map and reduce functions). Specifically, a coordinator task may include code executable to review a set of data to be processed, determine a set of map tasks to analyze the set of data, assign portions of the set of data to each map task, and call the on-demand code execution system 110 to execute each map task with respect to the assigned portions. The coordinator task may further include code executable to receive a notification that a specific portion of data has been analyzed according to a map (or reduce) task, to determine whether any reduce tasks are needed to reach a single results file, assign data as inputs to the reduce tasks, and call the on-demand code execution system 110 to execute the reduce tasks with respect to the assigned portions. In one embodiment, the coordinator task is event driven, such that completion of a map or reduce task, or detection of output data from such a task, results in an execution of the coordinator task to determine what additional map or reduce tasks, if any, are necessary to conclude analysis, and to call for execution of such additional tasks. Event-drive executions of the coordinator task may continue until an execution of the coordinator task detects that a single, fully reduced set of output data has been produced. The execution of the coordinator task may then notify a user that analysis of the data set has completed, with the fully reduced output data representing a result of the analysis. While example embodiments are described herein utilizing a single coordinator task (e.g., across multiple executions), in some instances multiple coordinator tasks may be utilized. For example, a first coordinator task may include code executable to manage division of a data set into portions and assignment of those portions to executions of a map task, while as second coordinator task includes code executable to manage reduction of outputs of the map task executions via executions of the reduce task.

To enable storage of tasks, the on-demand code execution system 110 may include a task data store 160, which may correspond to an persistent or substantially persistent data store, such as a hard drive (HDD), a solid state drive (SDD), network attached storage (NAS), a tape drive, or any combination thereof. In accordance with embodiments of the present disclosure, the task data store may include one or more coordinator tasks 162, one or more map tasks 164, and one or more reduce tasks 166.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution environment, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
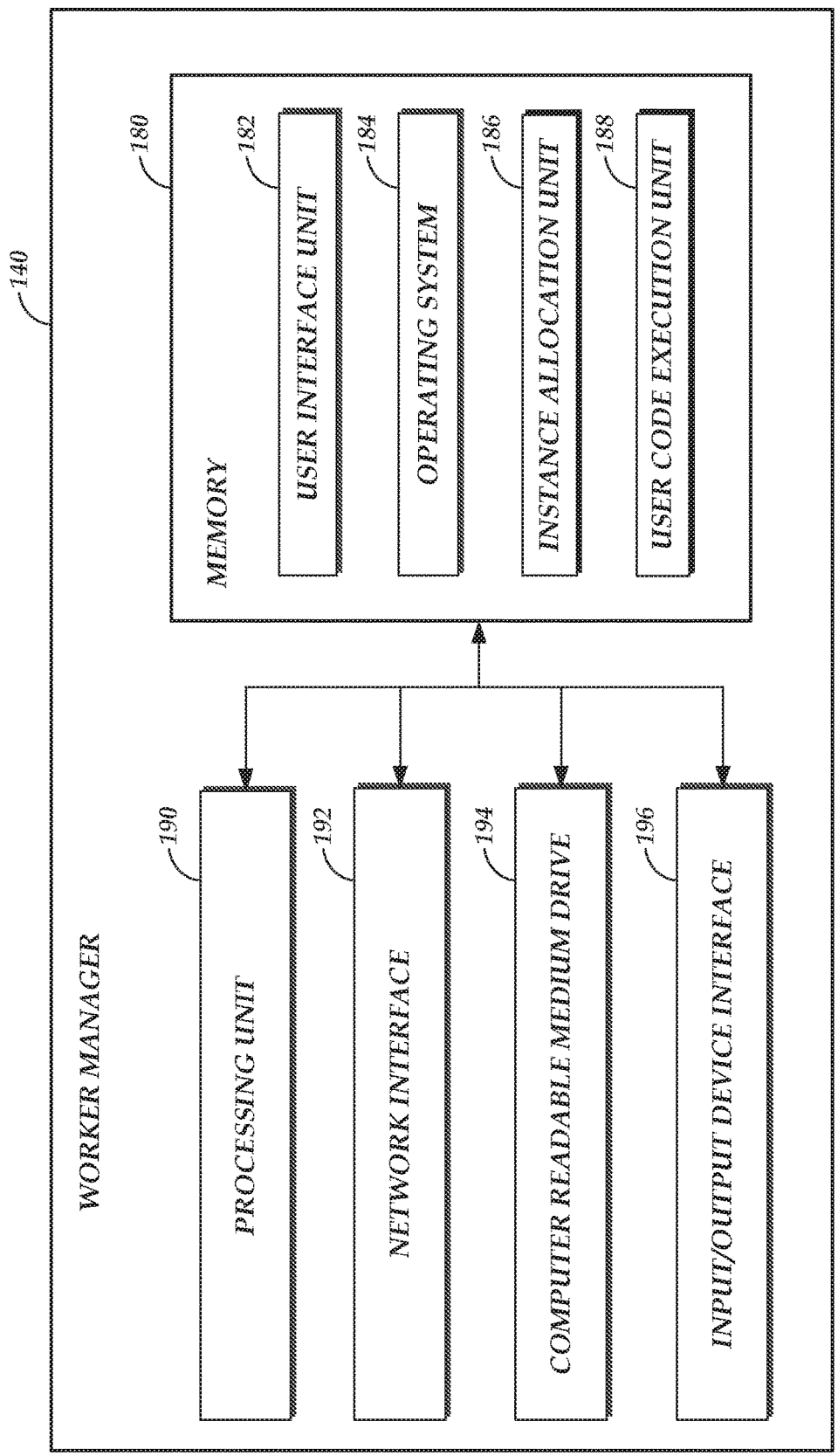
FIG. 2 depicts a general architecture of a computing device providing a worker manager 140 of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
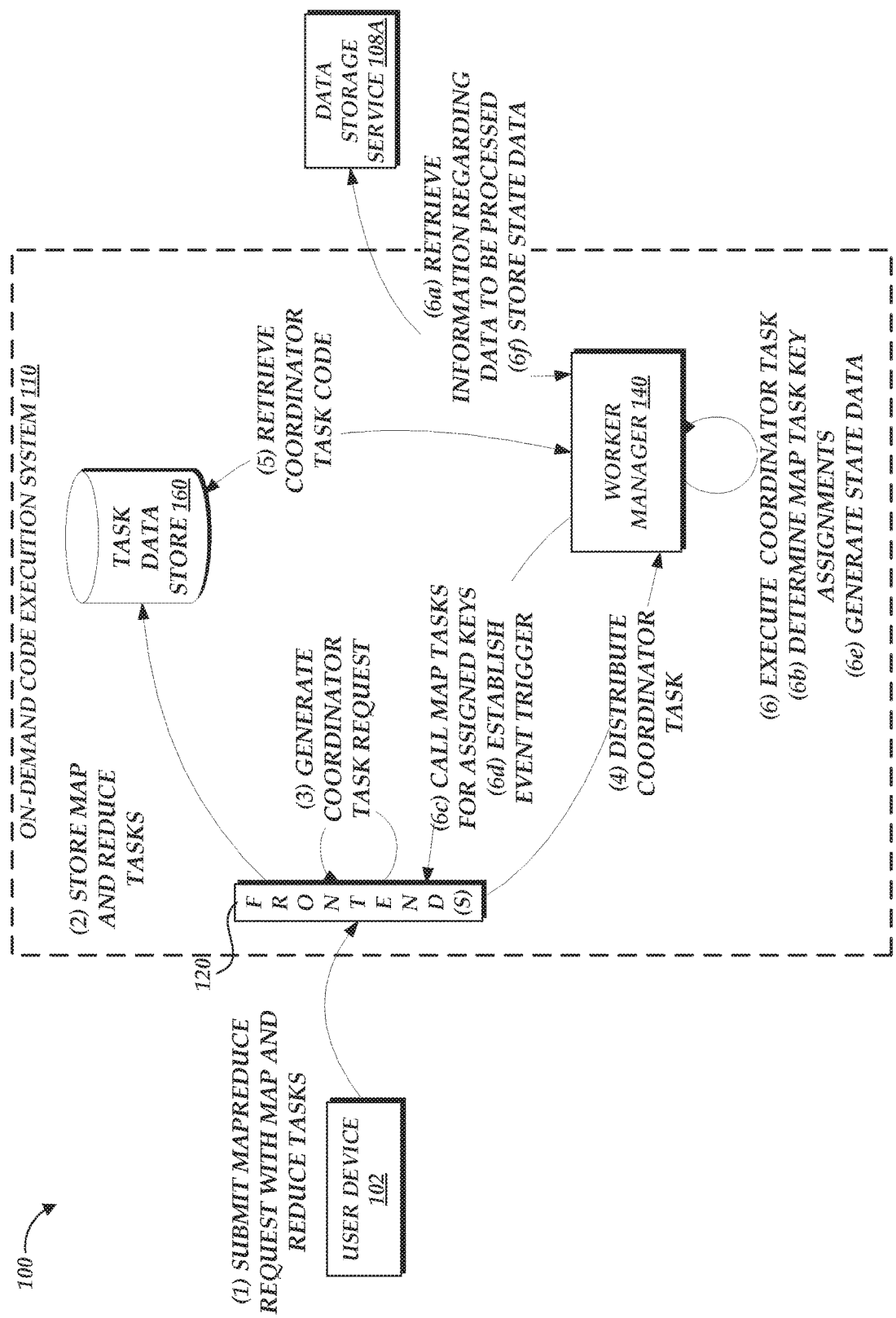
FIG. 3 is a flow diagram depicting illustrative interactions for executing a task on on-demand code execution environment of FIG. 1 to implement a portion of controller functionality within an implementation of the MapReduce programming model, and to initiate additional tasks implementing a map function within the implementation of the MapReduce programming model.

With reference to FIG. 3, illustrative interactions are depicted for implementing an initial execution of a coordinator task, in order to initiate processing of a data set on the on-demand code execution system 110 according to the MapReduce programming model. Specifically, the interactions of FIG. 3 are illustrative of those that may be undertaken to receive and respond to a user request to process a data set on a network based data storage service 108, according to map and reduce functions provided by the user.

The interactions of FIG. 3 begin at (1), where a user device 102 submits a MapReduce request to the frontend 120, requesting that a set of data be processed by the on-demand code execution system 110 according to an implementation of the MapReduce programming model utilizing a map function and a reduce function designated by the user device 102. In the illustrative interactions of FIG. 3, the map function and reduce function are designated as tasks within the on-demand code execution system 110, which may have been previously created by the user device 102 or which may be created by the on-demand code execution system 110 in response to the request submitted at (1). In other embodiments, a user may submit a request and designate other map and reduce functions, such as those carried out by tasks made available by the on-demand code execution system 110 or other users. In addition to designation of map and reduce functions, the request further includes information identifying a set of data to be processed. In the illustrative interactions of FIG. 3, the set of data resides on a data storage service 108A in communication with the on-demand code execution system 110 (which data storage service 108A and on-demand code execution system 110 may, for example, be implemented by a common entity). Accordingly, the request may include an identifier of the set of data, such as a uniform resource identifier (URI) or other identifier of the data on the data storage service 108A.

On receiving the request, the frontend 120, at (2), transmits the provided map and reduce tasks (if required) to the task data store 160, for later retrieval and execution. In addition, at (3), the frontend 120 generates an execution to a coordinator task to coordinate execution of the map and reduce tasks. Thereafter, at (4), the frontend 120 distributes the execution of the coordinator task to the worker manager 140. While not shown in FIG. 3, the frontend 120 may in some instances undertake other operations regarding the execution of the coordinator task, such as queueing the request to execute the coordinator task. Such operations are described in more detail in the '556 Patent, incorporated by reference above.

At (5), the worker manager retrieves code corresponding to the coordinator task from the task data store 160, if required (e.g., if the code is not already provisioned within an execution environment managed by the worker manager 140). At (6), the worker manager executes the coordinator task within an execution environment. Further details of how such an execution environment may be selected, provisioned with requisite data, and managed, are provided in the '556 Patent, incorporated by reference above.

Interactions occurring during execution of the coordinator task are shown in FIG. 3 as references (6a) through (6f).

While reference is made herein to actions of a "coordinator task" for ease of reference, these references are generally intended to refer to actions of a computing device hosting an execution environment in which code of the coordinator task is executing.

At (6a), the coordinator task interacts with the data storage service 108A (as identified in the initial user request and passed to the coordinator task, e.g., as an execution parameter) to retrieve information regarding the set of data to be processed. Illustratively, the information retrieved may include metadata about the set of data, such as a number of files, records, or entries in the set, a size of such files, records, or entries, a distribution of such files, records, or entries (e.g., according to file name, file size, or other attributes), etc.

At (6b), the execution coordinator task utilizes the determined information to "key assignments" for a set of map tasks. Such key assignments may logically divide the set of data on the data storage service 108A into "chunks," with each chunk being processed by a distinct execution of a map task on the on-demand code execution system 110. Each chunk may be identified by one or more "keys" within the chunk, where keys correspond to an identifiers of data within the chunk (e.g., file names, database keys, regular expression values, etc.). Generally, analysis of data may proceed more quickly as the number of chunks, and therefore the number of distinct executions of a map task, grow (as increased chunks generally result in increased parallelization). However, processing of each chunk by an execution of the map task may require some "overhead" processing, such that diminishing or negative returns are experienced as the number of divisions made to a data set grows. In one embodiment, the coordinator task may be configured to divide the set of data into a number of chunks expected to optimize overall processing time for data. This number of chunks may be determined, for example, based on a threshold minimize size of chunk data (e.g., determined based on results of prior implementations of the MapReduce programming model, manually established, etc.). In another embodiment, the coordinator task may determine a number of chunks based on user-specified parameters (e.g., desired number of chunks, desired chunk size, etc.). In yet another embodiment, the coordinator task may determine a number of chunks based on attributes of the on-demand code execution system 110. For example, the on-demand code execution system 110 may establish a maximum amount of memory available to an execution of a task. In such instances, the coordinator task may determine a number of chunks by sizing each chunk such that processing of the chunk will not utilize more than the maximum amount of memory available for such processing. In one embodiment, the amount of memory utilized to process a chunk of data may be determined based on an algorithm provided by the on-demand code execution system 110. (e.g., memory utilized is estimated to be X % of the size of a chunk), and the set of data may be divided into chunks such that the amount of memory utilized to process the chunk is equal to or less than the maximum amount of memory available for an individual execution of a task. In another embodiment, the amount of memory utilized to process a chunk of data may be based on historical information, such as an algorithm derived from analysis of prior executions coordinator tasks on the on-demand code execution system 110. In yet another embodiment, a coordinator task may utilize information from prior executions of a map task with respect to the data to be analyzed to determine a correspondence between an amount of memory used and a size of a chunk. For example, the coordinator task may use information from prior analyzes of the set of data, or may implement a map task (e.g., with respect to a random sampling of the set of data) and estimate the correspondence between an amount of memory used and a size of a chunk based on an analysis of that map task.

After determining a logical division of the set of data into chunks, the coordinator task may assign each chunk to an individual execution of the map task. Thereafter, at (6c), the coordinator task can transmit calls to the frontend 120 to execute instances of the map task with respect to each chunk of data. As will be described below with reference to FIG. 4, the frontend 120 may then initiate executions of the called map tasks to process the set of data. To facilitate further management of the map tasks, the coordinator task, at (6d), can also request that the frontend 120 establish an event trigger for the coordinator task, such that the task is executed (e.g., as a new execution or resumption of a prior execution) when an execution of the map task completes. In one embodiment, the event trigger may be based on the execution of each map task directly, such that the frontend 120 can monitor for successful execution of map task, and initiate an execution of the coordinator function in response. In another embodiment, the event trigger may be based on inclusion of new data at the data storage service 108A within a specified location or with a specified identifier, indicating that the new data is an output from an execution of the map task. Thus, each time an execution of the map task completes, the frontend 120 may detect such completion by virtue of that execution's output on the data storage service 108A, and initiate execution of the coordinator task.

To facilitate the subsequent execution of the coordinator task, the coordinator task can further, to (6e), generate state data for the task. Such state data may include any information required by a subsequent execution of the coordinator task to resume management of the analysis of the set of data. Illustratively, the state data may include information identifying the set of data, the chunks of the set of data determined by the coordinator task, and the state of calls to execute the map task with respect to each chunk. Thereafter, the coordinator task may store the state data in the data storage service 108A (or other persistent data store), at (6f). As will be described below with reference to FIG. 4, on subsequent executions, the coordinator task may utilize the state information (along with other information) to determine what additional tasks, if any, are required to move analysis of the set of data toward completion. The execution of the coordinator task may then complete. Advantageously, because subsequent executions of the coordinator task may be event-driven, the coordinator task need not execute during execution of the map or reduce tasks, thus reducing the computing resources utilized by the coordinator task. Accordingly, the worker manager 140 may take appropriate action to manage the execution environment of the completed coordinator task, such as tearing down the environment, repurposing the environment for execution of other tasks, etc.

Figure 4:
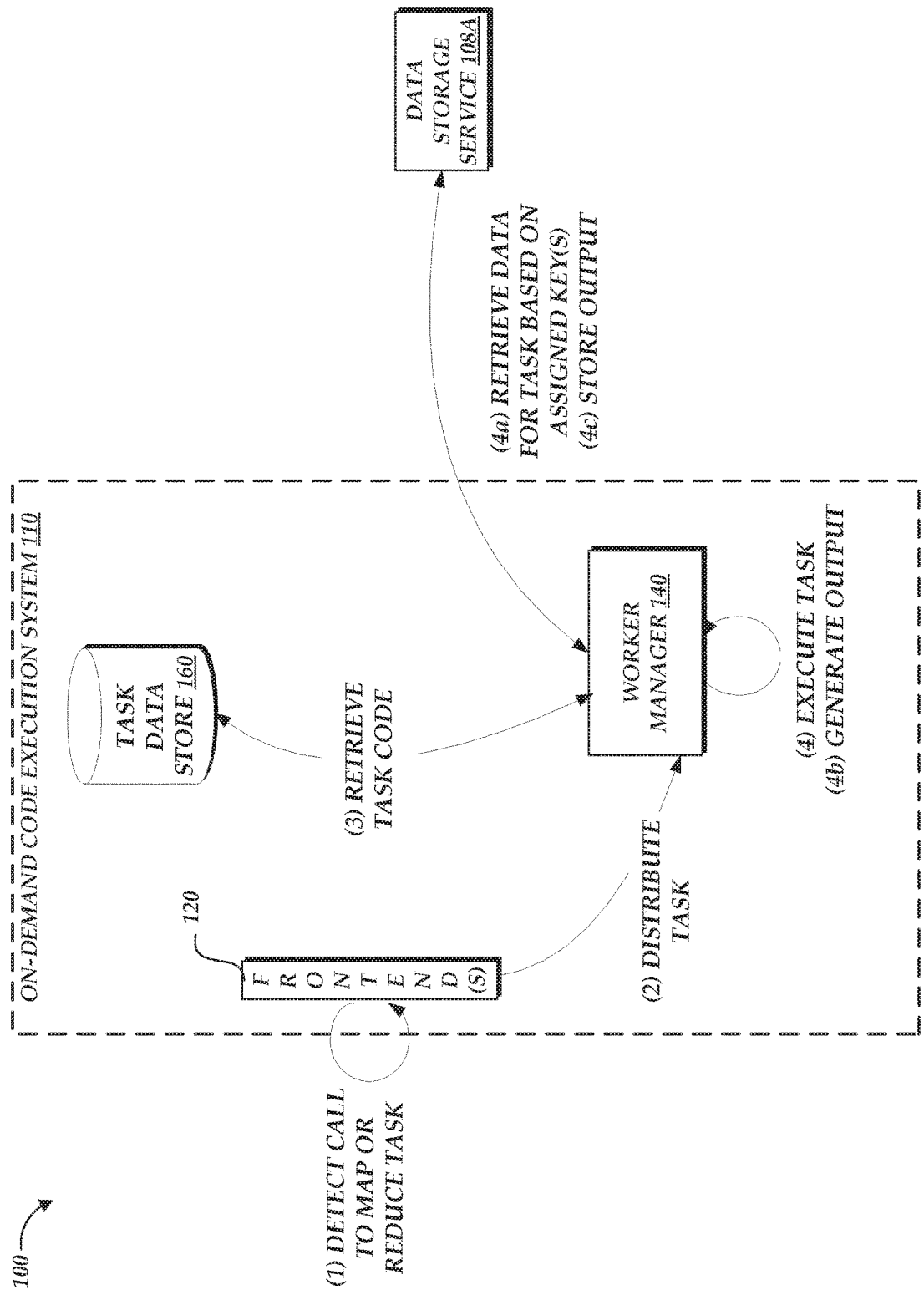
FIG. 4 is a flow diagram depicting illustrative interactions for executing a task on on-demand code execution environment of FIG. 1 to implement a map or reduce function within the implementation of the MapReduce programming model.

With reference to FIG. 4, illustrative interactions are depicted for initiating a map task or a reduce task on the on-demand code execution system 110, in response to a call to the task. For example, the interactions of FIG. 4 may occur in response to a call to execute a map task, as generated in accordance with the interactions of FIG. 3, described above. As yet another example, the interactions of FIG. 4 may occur in response to a call to execute a reduce task, as will be described with reference to FIG. 5, below. While a single execution of a map or reduce task is described with reference to FIG. 4, multiple instances of such interactions may occur concurrently. Thus, the on-demand code execution environment may execute multiple instances of a map task in parallel with one another or with other tasks.

The interactions of FIG. 4 begin at (1), where the frontend 120 detects a call to execute a map task or a reduce task (e.g., as generated based on execution of a coordinator function). Illustratively, the call may include parameters for the map or reduce task, such as data to be processed by the execution, as well as a location of that data. For the purposes of FIG. 4, it will be assumed that such data is stored at the data storage service 108A; however, the data may be stored at any location accessible to the on-demand code execution system.

At (2), the frontend 120 distributes the called task to the worker manager 140. As noted above, the frontend 120 may in some instances undertake additional interactions with respect to a called task, such as queuing the task within an execution queue prior to distribution. These additional interactions are described in more detail within the 'XXX Patent, incorporated by reference above. At (3), the worker manager 140 retrieves code for the called task from the task data store 160, as required. Thereafter, at (4), the worker manager 140 executes the called task within an execution environment (e.g., a virtual machine instance or container) managed by the worker manager. Thus, functionality of the called task, as defined by code corresponding to the called task, may be implemented by a computing device hosting the execution environment.

This functionality of the called task, implemented by a computing device hosting the execution environment, is depicted in FIG. 4 as references (4a) through (4c). Specifically, at (4a), the data to be processed by the called task is retrieved from the data storage device '108A, based on the keys of the data to be processed (e.g., where such keys are passed as parameters within the call to execute the function). Illustratively, where the task called is a map task, the data may correspond to a portion of the set of data to be analyzed, such as one or more books out of a collection of books. Where the task called is a reduce task, the data may correspond to intermediate results produced by a prior execution of a map task, such as an index of words identified in one or more books, as well as counts associated with such words.

At (4b), the task executes to process the retrieved data, in accordance with the code corresponding to the task. For example, where the task implements a map function, the task may analyze the chunk of data to determine a set of intermediate results, representing output of the task. Where the task implements a reduce function, the task may aggregate the input data to determine a set of aggregated results, which may represent subsequent intermediate results or a final result of an analysis. Thereafter, at (4c), the task stores the output in the data storage service 108A.

Figure 5:
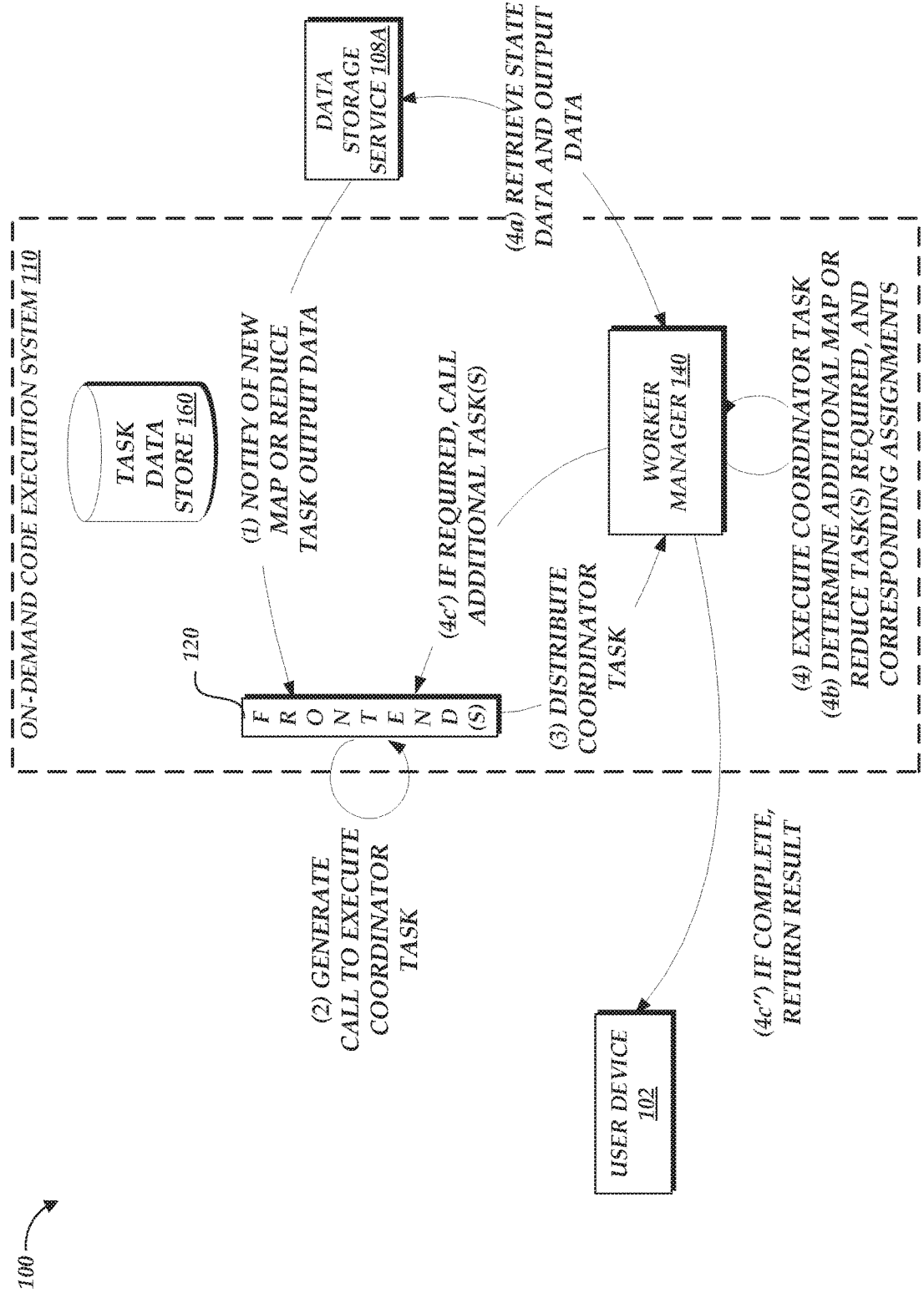
FIG. 5 is a flow diagram depicting illustrative interactions for detecting the occurrence of new data at a network-based data storage service, and utilizing the new data to implement an additional portion of the controller functionality within the implementation of the MapReduce programming model.

As noted above, a coordinator function implemented in accordance with embodiments of the present disclosure may be event-driven, such that completion of execution of a map or reduce task (e.g., at (4c) of FIG. 4, above), results in a subsequent call to execute the coordinator function. One example of interactions resulting from such a subsequent call is shown in FIG. 5. Specifically, with reference to FIG. 5, a data storage service 108A can notify the frontend 120 of new data at the data storage service 108A, corresponding to outputs of a map or reduce task. In one embodiment, such a notification is a "push" notification, such that the notification is independently generated at the data storage service 108A.

In another embodiment, such a notification is transmitted in response to polling by the frontend 120 of the data storage service 108A.

At (2), the frontend 120 generates a call to execute the coordinator task, in order to handle the new data. Execution of the coordinator task is then distributed from the frontend 120 to the worker manager 140, at (3). The worker manager 140, in turn, initiates execution of the coordinator task at (4). Thereafter, the execution of the coordinator task (e.g., as implemented by computing device hosting the execution environment of the coordinator task), can function to process the output data, determine what additional functions if any are required to move analysis of a data set to completion, to initiate execution of such additional functions, and to notify a user computing device 102 of the results of the analysis.

Specifically, at (4a), the coordinator task can interact with the data storage service 108A to retrieve state data for the coordinator task (e.g., as generated during a past execution of the coordinator task) and any new output data (e.g., as generated by executions of the map or reduce tasks). The coordinator task may then utilize the state data and output data to determine what additional functions if any are required to move analysis of a data set to completion. In one embodiment, the coordinator task may utilize state data to track the status of a call to a map task regarding each logical chunk of a data set. Accordingly, as the coordinator task identifies a new output file or record within the data storage service 108A corresponding to a given chunk, the coordinator task may mark such chunk as "complete" within state data. In instances where an execution of a map task corresponding to a chunk is not detected to be complete within a threshold amount of time after a call to the execution, the coordinator task may implement an error handling routine, such as restarting the execution.

At (4b), the coordinator task can determine an additional map or reduce tasks required, as well as corresponding data to be assigned to such tasks. In one embodiment, the coordinator task may function to await output corresponding to each chunk of a data set before initiating reduce tasks corresponding to the analysis. Accordingly, on detecting new output data at the data storage service 108A, an execution of a coordinator task may update state data to indicate that a given chunk of a data set has been processed by a map task, determine whether all chunks have been processed, and if not all chunks have yet been processed, to halt or cease execution. In the instance that all chunks have been processed, the coordinator task may initiate a set of reduce tasks, configured to aggregate the outputs of the map tasks (or outputs of other reduce tasks), and combine such outputs into a single output file. Illustratively, where all current output files (e.g., all outputs of all map tasks) are processable by a single reducer task, the coordinator task may call for execution of the reducer task to result in a final output representative of the results of the analysis. Where multiple executions of a reducer task are required to process current output files, the coordinator task may divide the current output files into groups, and assign an individual reducer task to aggregate the output files of each group, to result in intermediate outputs. Subsequent executions of the coordinator task may then call subsequent executions of the reducer task to aggregate these intermediate outputs, until only a single output file remains. In this manner, the coordinator task may view output files of both map tasks and reducer tasks as interchangeable, and continue passing such output files to reducer tasks until a single output file is obtained. Where multiple executions of a reducer task are required to process current output files, the coordinator can utilize any number of packing algorithms to assign groups of output files to an individual execution of a reducer task. For example, the coordinator task may determine a maximum total size of output files processable by a reducer task (e.g., based on the memory available to the execution of the reducer task and the amount of memory estimated to be used to aggregate the output files), and divide the output files into groups, with each group having a total size less than the maximum total size.

In the instance that additional map or reduce tasks are required, the coordinator task, at (4c'') transmits calls to the frontend 120 to execute the tasks. The execution of the coordinator task may then end (e.g., to be re-initiated based on a pre-defined event, such as new data being available at the data storage service 108A or the completion of the called tasks). In the instance that no additional calls are required (e.g., due to a single output file being obtained that represents results of the analysis), the coordinator task, at (4c''), can notify the user device 102 associated with the analysis that the task has completed . . . .

While described sequentially in order of the corresponding figures, the interactions of FIGS. 3-5 may occur repeatedly and in varying orders. For example, the interactions of FIG. 3 may occur in order to logically device a set of data into chunks, and request that each chunk be analyzed by an execution of a map task. Thereafter, multiple instances of the interactions of FIG. 4 may occur with respect to each map task. On completion of each map task, the interactions of FIG. 5 may occur, to determine whether any additional tasks, such as reduce tasks, are required. If so, the interactions of FIG. 4 may again occur to execute a reducer task and result in output data, which may result in the interactions of FIG. 5 being implemented with respect to that output data. This pattern may repeat until a single output file is obtained, representing results of the analysis. Thus, ordering of the figures shown herein is intended merely for purposes of description. Moreover, the interactions of any of FIGS. 3-5 may vary in different embodiments of the present disclosure. For example, in some embodiments a coordinator task may be configured to initiate execution of a reducer task in response to detecting that a threshold number of output files exist in the data storage service 108A, regardless of whether all executing map or reduce tasks have completed. As another example, the coordinator task may be configured to determine whether data on the data storage service 108A exists with respect to a given data set that would eliminate the need to execute a map task with respect to at least a portion of that data set. Illustratively, where multiple user devices 102 request analysis of a given data set, outputs of a prior execution of a map task with respect to a portion of that data set may already exist on the data storage service 108A, eliminating the need to re-execute the map task with respect to that portion. Thus, the specific interactions of FIG. 3-5 are intended to be illustrative.

Figure 6A:
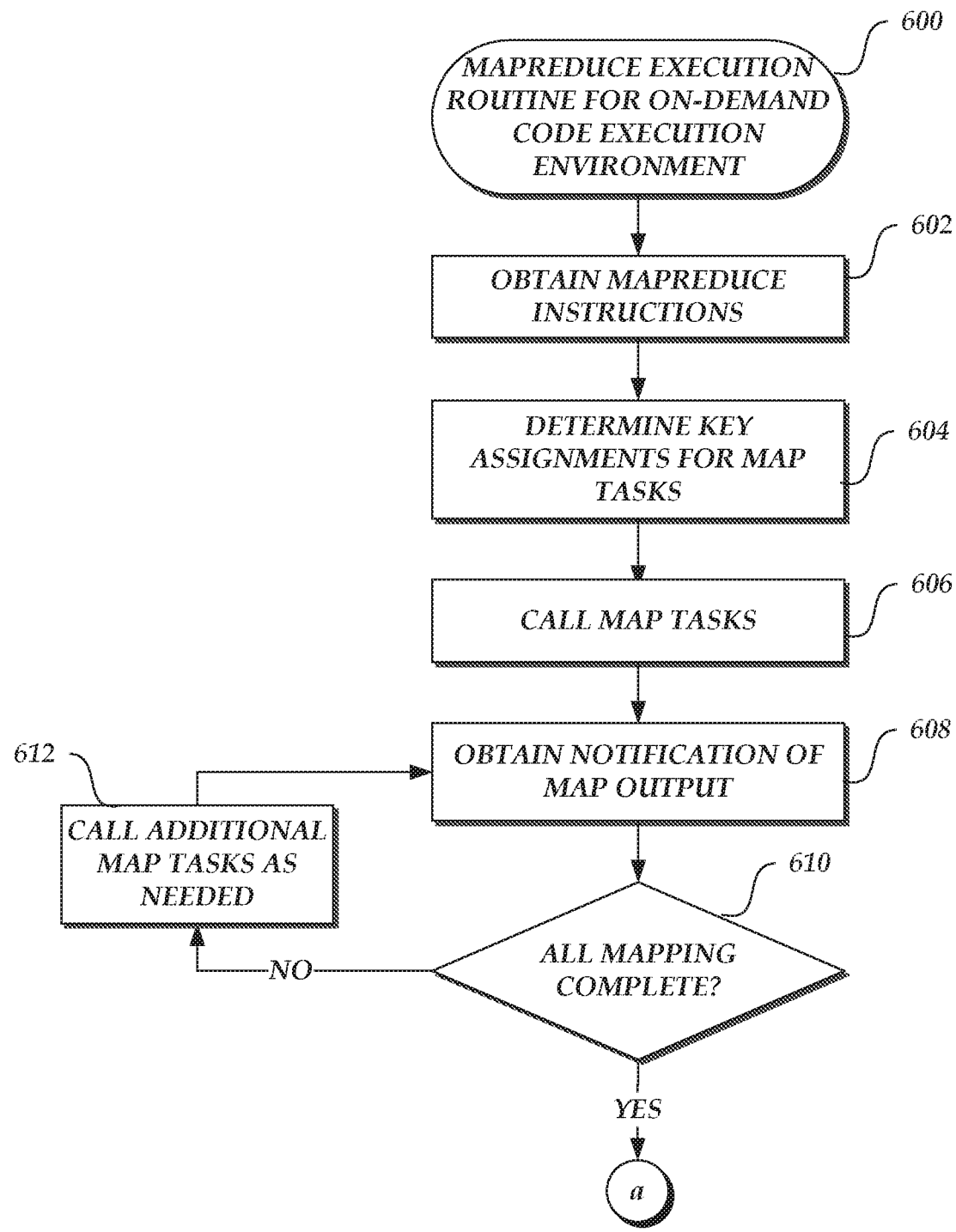
FIGS. 6A and 6B form a flow chart depicting an illustrative routine for utilizing an on-demand code execution environment to process data sets according to the MapReduce programming model, at least partly by use of a coordinator implemented as one or more tasks within the on-demand code execution environment.
Figure 6B:
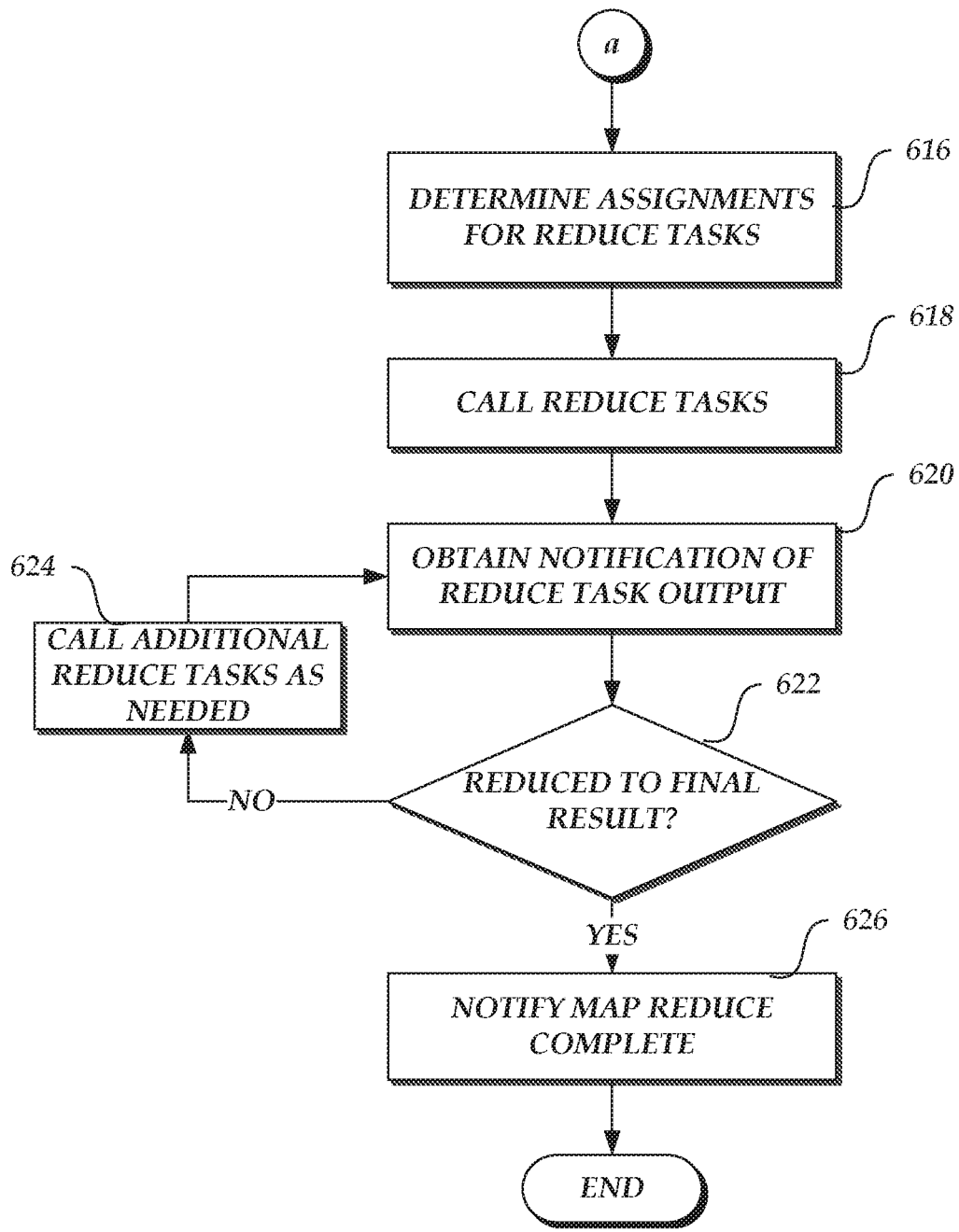

With reference to FIGS. 6A and 6B, block diagrams will be described depicting an illustrative routine 600 for implementing the MapReduce programming model by use of tasks executing on the on-demand code execution system 110. Illustratively, the routine 600 may be carried out by one or more instances of a coordinator task executing on the on-demand code execution system 110. The routine 600 begins at block 602, where the coordinator task receives instructions to process data according to the implementation of the MapReduce programming model. The instructions may be generated, for example, by the on-demand code execution system 110 (e.g., via a frontend 120), in response to receiving a user request to process the set of data. The instructions can include, for example, parameters designating the set of data (e.g., as located in a network-accessible storage service 108) and map and reduce tasks by which to process the data. In one embodiment, the map and reduce tasks may be designated within the reference as pre-existing tasks on the on-demand code execution system 110 (e.g., as generated by an administrator of the on-demand code execution system 110, the user submitting the request, or other users). In another embodiment, the map and reduce tasks may be generated by the on-demand code execution system 110 in response to the request, based on code corresponding to each of the map and reduce functions included within the request.

At block 604, the coordinator task logically divides the set of data into "chunks," each representing a portion of the set of data to be assigned to an individual execution of the map task. As noted above, the coordinator task may utilize a variety of parameters in dividing the set of data. For example, the coordinator task may utilize parameters specified within the request to process the data, such as a desired chunk size or a desired number of chunks, and attempt to meet those parameters in dividing the data. As another example, the coordinator task may attempt to maximize the speed at which analysis of the data completes, by dividing the data into a maximum number of chunks possible before experiencing significantly diminishing returns (e.g., as determined based on historical analysis). As yet another example, the coordinator task may attempt to "pack" each execution of a map task with a threshold amount of data, where the threshold amount is selected in order to utilize no more than a maximum amount of memory available to an individual execution of the map task. For example, the coordinator task may determine that processing x gigabytes of data generally utilizes y gigabytes of memory of a task execution (where y is a percentage of x, as may be determined, e.g., by manual specification, analysis of prior executions, etc.), and thus divide the set of data into chunks of a size x selected such that y is near to, but does not exceed, the maximum memory available to a task execution (e.g., as specified by the configuration of the on-demand code execution system 110). Thereafter, the coordinator task determines "keys" (and identifier of files, records, or entries within the data set) for each chunk, and assigns the keys for each chunk to an individual execution of the map task.

At block 606, the coordinator task transmits calls to the on-demand code execution system 110 requesting execution of an individual map task to process the keys of each determined chunk. In one embodiment, code corresponding to the coordinator task may complete after transmitting calls to execute individual map tasks, thus allowing the on-demand code execution system 110 to halt or pause execution of the coordinator task while the map tasks execute. In such embodiments, the coordinator task may establish an event trigger at the on-demand code execution system 110, such that completion of a map task results in a subsequent execution of the coordinator task (e.g., as a new task or as a resumption of the prior task). For example, the coordinator task may transmit a request to a frontend 120 to execute the coordinator task on determining that an execution of the map task has completed, or on detection of an output file of the map task (e.g., on a network-accessible data storage service 108). To facilitate resumption of the routine 600 across executions of the coordinator task, the task can further write state data (e.g., to a network-accessible data storage service 108) indicating a state of the analysis, such as the division of the set of data into chunks, the assignments of chunks to individual executions of map tasks, and the state of those map tasks.

At block 608, the coordinator task obtains a notification of an output of a map task execution, indicating that the map task execution has completed. Illustratively, the notification may be received as an "event notification" from a network-accessible data storage service 108 on which the output of map task executions are written. In one embodiment, the notification may satisfy an event trigger for the coordinator task, causing the on-demand code execution system 110 to generate a new execution of the coordinator task (or to resume a prior execution). If the output indicates that a map task execution has completed successfully (e.g., the map function has been executed with respect to a chunk of the set of data), the coordinator task may update a state of the map task execution corresponding to the output, to indicate that the map task execution has completed successfully.

At block 610, the coordinator task determines whether mapping of the set of data has completed (e.g., whether each chunk of the set of data has been successfully processed by a map task execution). Illustratively, the coordinator task may inspect state data indicating whether each chunk of data has been successfully processed via the map task execution. If so, the routine 600 continues at connector 'a', as shown on FIG. 6B. Otherwise, the routine 600 proceeds to block 612, where the coordinator task executes additional instances of the map task, as required. Illustratively, where the coordinator task determines that an execution of map task processing a given chunk of data has completed unsuccessfully, or has not completed in a threshold amount of time, the coordinator task may call for an additional execution of the map task with respect to the chunk of data. The routine 600 then returns to block 608. In some embodiments, the coordinator task may complete execution after block 612, thus allowing the on-demand code execution environment to cease or pause execution of the coordinator task until another event trigger for the task occurs at block 608.

With reference now to FIG. 6B, after all chunks of the set of data have been mapped, the routine 600 continues at block 616, where the coordinator task determines an assignment of the outputs produced by the map tasks to one or more reduce tasks. As noted above, a reduce task can generally function to aggregate intermediate results produced as outputs of a map task executions (or a prior reduce task executions) into a single output. Thus, where all outputs of all map task executions can be processed by a single execution of the reduce task, the coordinator task may assign all outputs of all map task executions to the single execution. Where constraints on a single execution of a reduce task would not allow processing of all outputs of all map task executions, the coordinator can divide the outputs among a plurality of reduce task executions. In one embodiment, the constraints on a single execution may be based on configuration of the on-demand code execution system 110, such as a maximum memory available to an execution of the reduce task. Thus, the coordinator task may divide outputs of the map task executions (or prior reduce task executions) such that a portion assigned to an individual execution of the reduce task is not expected to require more than the maximum memory available to the execution. In another embodiment, the constraints on a single execution may be based on parameters specified by a user, such as a maximum data size to be processed by an individual execution of a reduce task. In some instances, the coordinator task may divide outputs of map task executions (or prior reduce task executions) into more portions than would be required to satisfy constraints on individual executions of a reduce task. For example, the coordinator task may select a size of each portion of the output of the map task executions (or prior reduce task executions) to attempt to increase the speed of the overall analysis of the data. Illustratively, the coordinator task may obtain data from the on-demand code execution system 110 indicating an expected optimal size for each portion of the outputs of map task executions (or prior reduce task executions) in order to reach a single output file in a minimum amount of time. This optimal size may be determined by the on-demand code execution system 110, based on analysis of prior executions of the coordinator task.

At block 618, the coordinator task transmits calls to the on-demand code execution system 110 requesting execution of an individual reduce task to process each assigned portion of the outputs of the map task executions (or prior reduce task executions). In one embodiment, code corresponding to the coordinator task may complete after transmitting calls to execute individual reduce tasks, thus allowing the on-demand code execution system 110 to halt or pause execution of the coordinator task while the reduce tasks execute. In such embodiments, the coordinator task may establish an event trigger at the on-demand code execution system 110, such that completion of a reduce task execution results in a subsequent execution of the coordinator task (e.g., as a new execution or as a resumption of the prior execution). For example, the coordinator task may transmit a request to a frontend 120 to execute the coordinator task on determining that an execution of the reduce task has completed, or on detection of an output file of the reduce task (e.g., on a network-accessible data storage service 108). To facilitate resumption of the routine 600 across executions of the coordinator task, the task can further write state data (e.g., to a network-accessible data storage service 108) indicating a state of the analysis, such as the division of the outputs into assigned portions, the assignments of portions of the outputs to individual executions of the reduce tasks and the state of those executions of the reduce task.

At block 620, the coordinator task obtains a notification of an output of a reduce task execution, indicating that the reduce task execution has completed. Illustratively, the notification may be received as an "event notification" from a network-accessible data storage service 108 on which the output of map task executions are written. In one embodiment, the notification may satisfy an event trigger for the coordinator task, causing the on-demand code execution system 110 to generate a new execution of the coordinator task (or to resume a prior execution). If the output indicates that a reduce task execution has completed successfully (e.g., the reduce function has been executed with respect to multiple outputs of map task executions or prior reduce task executions), the coordinator task may update a state of the reduce task execution corresponding to the output, to indicate that the map task has completed successfully.

At block 622, the coordinator task determines the outputs of the map task executions have been reduced to a single result, aggregating those outputs. Illustratively, the coordinator task may inspect a data storage service 108 to determine whether a single output file exists in the service 108 (indicating a completed analysis), or whether multiple output files exist (indicating that further reduction is needed). If a single output file is present, the routine 600 continues to block 626, where the coordinator task transmits a notification to a user (e.g., to a user device 102) that analysis of the set of data is complete. The routine 600 can then end. Otherwise, the routine 600 proceeds to block 624, where the coordinator task transmits calls to additional executions of the reduce task, as required. Illustratively, the coordinator task may inspect state data indicating whether each output file has been assigned to a currently executing instance of the reduce task. If an output file has been assigned to an executing instance of the reduce task, but the execution has not completed in a threshold amount of time, the coordinator task may request that the on-demand code execution system 110 halt and restart the execution. If multiple output files exist that are not yet assigned to an execution of the reduce task, the coordinator task may request that the on-demand code execution system 110 begin a new execution of the reduce task, in order to reduce the multiple output files to a single output file. In some instances, the coordinator task may call for executions of the reduce task as "rounds," such that the coordinator task awaits for all executions of the reduce task from a current "round" to complete before calling for an execution of the reduce task in a new "round." Each round may include a plurality of reduce task executions that collectively process all current outputs of map task executions or prior reduce task executions. For example, a first round may utilize 100 reduce task executions to process 1000 outputs of map task executions, a second round may utilize 10 reduce task executions to process the 100 outputs of the first round of reduce task executions, and a third round may utilize a single reduce task execution to process the 10 outputs of the second round of reduce task executions. Thus, the coordinator task may utilize multiple rounds of reduce task executions to exponentially reduce the outputs of the map task executions to a single output.

Returning to the description of block 624, after transmitting the calls for any additional reduce tasks, the routine 600 returns to block 620. In some embodiments, the coordinator task may complete execution after block 624, thus allowing the on-demand code execution environment to halt or pause execution of the coordinator task until another event trigger for the task occurs at block 620. The routine 600 may then proceed as described above until a single output file is obtained, at which time the routine may proceed to block 626, where the coordinator task transmits a notification to a user (e.g., to a user device 102) that analysis of the set of data is complete. The routine 600 can then end.

While illustrative interactions are described above with respect to the routine 600, the routine 600 may be modified in different embodiments to include additional or alternative interactions. For example, in some embodiments of the present disclosure, the on-demand code execution system 110 may function to automatically generate map and reduce tasks from information provided by a user device 102, such as Structured Query Language (SQL) queries. Additional details regarding translation of SQL queries to a MapReduce framework can be found in: queries to a MapReduce framework can be found in:

YSmart: Yet another SQL-to-MapReduce Translator", Proceedings of 31st International Conference on Distributed Computing Systems (ICDCS 2011), Minneapolis, Minn., Jun. 20-24, 2011 (with Y. He, Y. Huai, R. Lee, and F. Wang), available at http://web.cse.ohio-state.edu/hpcs/WWW/HTML/publications/papers/TR-11-7.pdf; and Couchbase Server 3.0/3.1 Documentation, Translating SQL to map/reduce, retrieved on Sep. 23, 2016, available at http://docs.couchbase.com/admin/admin/Views/views-translateSQL.html;

the entireties of which are incorporated by reference herein. As another example, in some embodiments of the present disclosure, a coordinator task may be configured to utilize outputs of prior instances of a map task or a reduce task, as executed in response to a distinct request to analyze a set of data, as a cached output for a current analysis of that set of data. Illustratively, where multiple users request the same or a similar analysis of a given set of data, a second or subsequent user's request may be fulfilled based on outputs generated based on a first user's request. Where multiple users request the same or a similar analysis of a given set of data concurrently, the outputs of an execution of the map or reduce tasks may be used to satisfy each user's request. As yet another example, in some embodiments of the present disclosure a coordinator task may be configured to schedule executions of a map task or a reduce task at least in part in serial. For example, a coordinator task may process a first percentage of a set of data utilizing a first round of executions of a map task, and the remaining percentage of the set of data utilizing a second round of executions of the map task. In some instances, data obtained from a first round of executions of a map task (e.g., the amount of memory used to process a given amount of data), may be used to vary the executions of the second round, such as by altering the size of chunks of data assigned to executions of the second. Thus, the interactions of FIGS. 6A and 6B described above are intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to utilize tasks in an on-demand code execution system as an implementation of the MapReduce programming model, the system comprising:
   a non-transitory data store configured to store:
      a map task, the map task corresponding to code executable by the on-demand code execution system to process a portion of a set of data to result in an output;
      a reduce task, the reduce task corresponding to code executable by the on-demand code execution system to process a plurality of outputs from individual executions of the map task to result in an aggregated output; and
      a coordinator task, the coordinator task corresponding to code executable by the on-demand code execution system to initiate executions of the map task and the reduce task;
   one or more processors in communication with the non-transitory data store and configured with computer-executable instructions to:
      obtain a request to analyze the set of data according to the implementation of the MapReduce programming model, wherein the request designates the map task and the reduce task;
      initiate a first execution of the coordinator task within the on-demand code execution system, wherein the first execution of the coordinator task causes the on-demand code execution system to:
         assign individual portions of the set of data to individual executions of the map task;
         implement the individual executions of the map task to process the individual portions of the set of data and result in the plurality of outputs;
         establish an event trigger for a second execution of the coordinator task, the event trigger requesting that the second execution of the coordinator task be initiated in response to completion of the individual executions of the map task; and
         halt the first execution of the coordinator task;
      detect completion of the individual executions of the map task; and
      in response to completion of the individual executions of the map task, initiate the second execution of the coordinator task within the on-demand code execution system, wherein the second execution of the coordinator task causes the on-demand code execution system to:
         implement at least one reduce task to process the plurality of outputs from the individual executions of the map task to result in an aggregated output; and
         return the aggregated output as a result of analysis of the set of data.

2. The system of claim 1, wherein the coordinator task comprises a first coordinator task corresponding to code executable by the on-demand code execution system to initiate executions of the map task and a second coordinator task corresponding to code executable by the on-demand code execution system to initiate executions of the reduce task, wherein the first execution of the coordinator task corresponds to an execution of the first coordinator task, and wherein the second execution of the coordinator task corresponds to an execution of the second coordinator task.

3. The system of claim 1, wherein the event trigger requests that an additional execution of the coordinator task be initiated in response to completion of any one of the individual executions of the map task, and wherein the one or more processors in are further configured with computer-executable instructions to:
   detect completion of a first execution of the map task; and
   initiate the additional execution of the coordinator task within the on-demand code execution system, wherein the additional execution of the coordinator task causes the on-demand code execution system to detect that a second execution of the map task has not yet completed and to halt the additional execution of the coordinator task.

4. The system of claim 1, wherein the at least one execution of the reduce task comprises multiple executions of the reduce task, the multiple executions comprising:
   a plurality of first executions of the reduce task to process the plurality of outputs from the individual executions of the map task to result in a plurality of intermediate aggregated outputs; and
   at least one second execution of the reduce task to process the plurality of intermediate aggregated outputs from the plurality of first executions of the reduce task to result the aggregated output.

5. A computer-implemented method to analyze a set of data utilizing tasks in an on-demand code execution system, the computer-implemented method comprising:
   obtaining a request to analyze the set of data, wherein the request designates:
      a map task corresponding to code executable by the on-demand code execution system to process a portion of the set of data to result in an output; and
      a reduce task corresponding to code executable by the on-demand code execution system to process a plurality of outputs from individual executions of the map task to result in an aggregated output; and
   initiating a first execution of a coordinator task within the on-demand code execution system, wherein the first execution of the coordinator task causes the on-demand code execution system to:
      assign individual portions of the set of data to individual executions of the map task;
      implement the individual executions of the map task to process the individual portions of the set of data and result in the plurality of outputs;
      establish an event trigger for a second execution of the coordinator task, the event trigger requesting that the second execution of the coordinator task be initiated in response to completion of the individual executions of the map task; and
      halt the first execution of the coordinator task;
   detecting completion of the individual executions of the map task; and
   in response to completion of the individual executions of the map task, initiating the second execution of the coordinator task within the on-demand code execution system, wherein the second execution of the coordinator task causes the on-demand code execution system to:
    implement at least one execution of the reduce task to process the plurality of outputs from the individual executions of the map task to result in an aggregated output; and
    return the aggregated output as a result of analysis of the set of data.

6. The computer-implemented method of claim 5, wherein the request includes the map task and the request task.

7. The computer-implemented method of claim 5, wherein execution of the coordinator task causes the on-demand code execution system to assign individual portions of the set of data to individual executions of the map task based at least in part on a memory expected to be utilized during an individual execution of the map task to process an individual portion of the set of data.

8. The computer-implemented method of claim 7, wherein the memory expected to be utilized during an individual execution of the map task to process an individual portion of the set of data is determined based at least in part on a parameter provided with the request to analyze the set of data or a parameter maintained by the on-demand code execution system.

9. The computer-implemented method of claim 8, wherein the parameter maintained by the on-demand code execution system is determined based at least in part on a prior execution of the map task.

10. The computer-implemented method of claim 5, wherein the coordinator task comprises a first coordinator task corresponding to code executable by the on-demand code execution system to initiate executions of the map task and a second coordinator task corresponding to code executable by the on-demand code execution system to initiate executions of the reduce task, wherein the first execution of the coordinator task corresponds to an execution of the first coordinator task, and wherein the second execution of the coordinator task corresponds to an execution of the second coordinator task.

11. Non-transitory computer readable media comprising instructions executable by an on-demand code execution system to analyze a set of data, wherein execution of the instructions cause the on-demand code execution system to:
    obtain a request to analyze the set of data, wherein the request designates:
        a map task corresponding to code executable by the on-demand code execution system to process a portion of the set of data to result in an output; and
        a reduce task corresponding to code executable by the on-demand code execution system to process a plurality of outputs from individual executions of the map task to result in an aggregated output; and
    initiate a first execution of a coordinator task within the on-demand code execution system, wherein the first execution of the coordinator task causes the on-demand code execution system to:
        assign individual portions of the set of data to individual executions of the map task;
        implement the individual executions of the map task to process the individual portions of the set of data and result in the plurality of outputs;
        establish an event trigger for a second execution of the coordinator task, the event trigger requesting that the second execution of the coordinator task be initiated in response to completion of the individual executions of the map task; and
        halt the first execution of the coordinator task;
    detect completion of the individual executions of the map task; and
    in response to completion of the individual executions of the map task, initiate the second execution of the coordinator task within the on-demand code execution system, wherein the second execution of the coordinator task causes the on-demand code execution system to:
        implement at least one execution of the reduce task to process the plurality of outputs from the individual executions of the map task to result in an aggregated output; and
        return the aggregated output as a result of analysis of the set of data.

12. The non-transitory computer-readable media of claim 11, wherein the request references the map task and the request task as tasks pre-existing on the on-demand code execution system.

13. The non-transitory computer-readable media of claim 11, wherein the first execution of the coordinator task causes the on-demand code execution system to implement the individual executions of the map task at least in part in serial, and wherein data regarding a first execution of the map task is utilized by the first execution of the coordinator task to modify an assignment of an individual portion of the set of data with respect to a second execution of the map task.

14. The non-transitory computer-readable media of claim 11, wherein the coordinator task comprises a first coordinator task corresponding to code executable by the on-demand code execution system to initiate executions of the map task and a second coordinator task corresponding to code executable by the on-demand code execution system to initiate executions of the reduce task, wherein the first execution of the coordinator task corresponds to an execution of the first coordinator task, and wherein the second execution of the coordinator task corresponds to an execution of the second coordinator task.

15. The non-transitory computer-readable media of claim 11, wherein execution of the coordinator task causes the on-demand code execution system to assign individual portions of the set of data to individual executions of the map task based at least in part on a memory expected to be utilized during an individual execution of the map task to process an individual portion of the set of data.

16. The non-transitory computer-readable media of claim 15, wherein the memory expected to be utilized during an individual execution of the map task to process an individual portion of the set of data is determined based at least in part on a parameter provided with the request to analyze the set of data or a parameter maintained by the on-demand code execution system.

17. The non-transitory computer-readable media of claim 16, wherein the parameter maintained by the on-demand code execution system is determined based at least in part on a prior execution of the map task.

* * * * *